Jan. 11, 1927.
J. E. ANTHONY ET AL
1,613,865
STEERING MECHANISM FOR TRACTORS
Filed Nov. 15, 1923    2 Sheets-Sheet 1
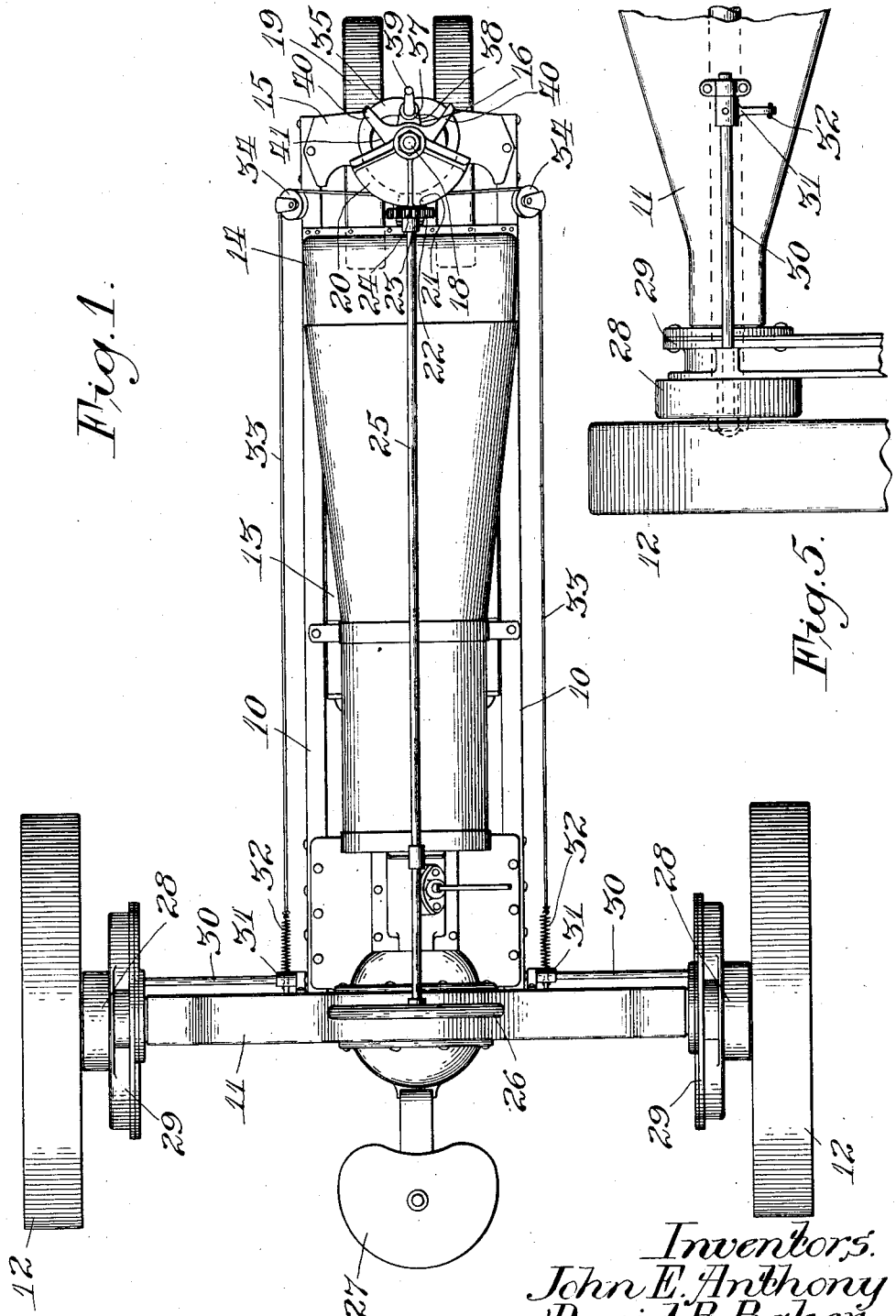

Jan. 11, 1927.  1,613,865
J. E. ANTHONY ET AL
STEERING MECHANISM FOR TRACTORS
Filed Nov. 15, 1923   2 Sheets-Sheet 2
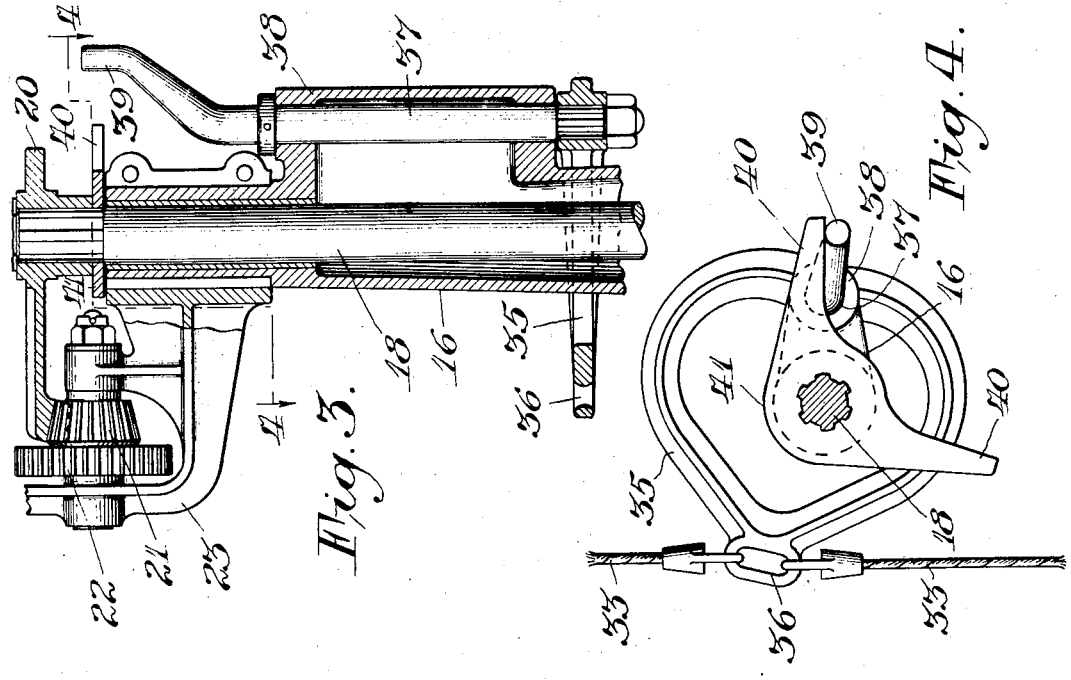
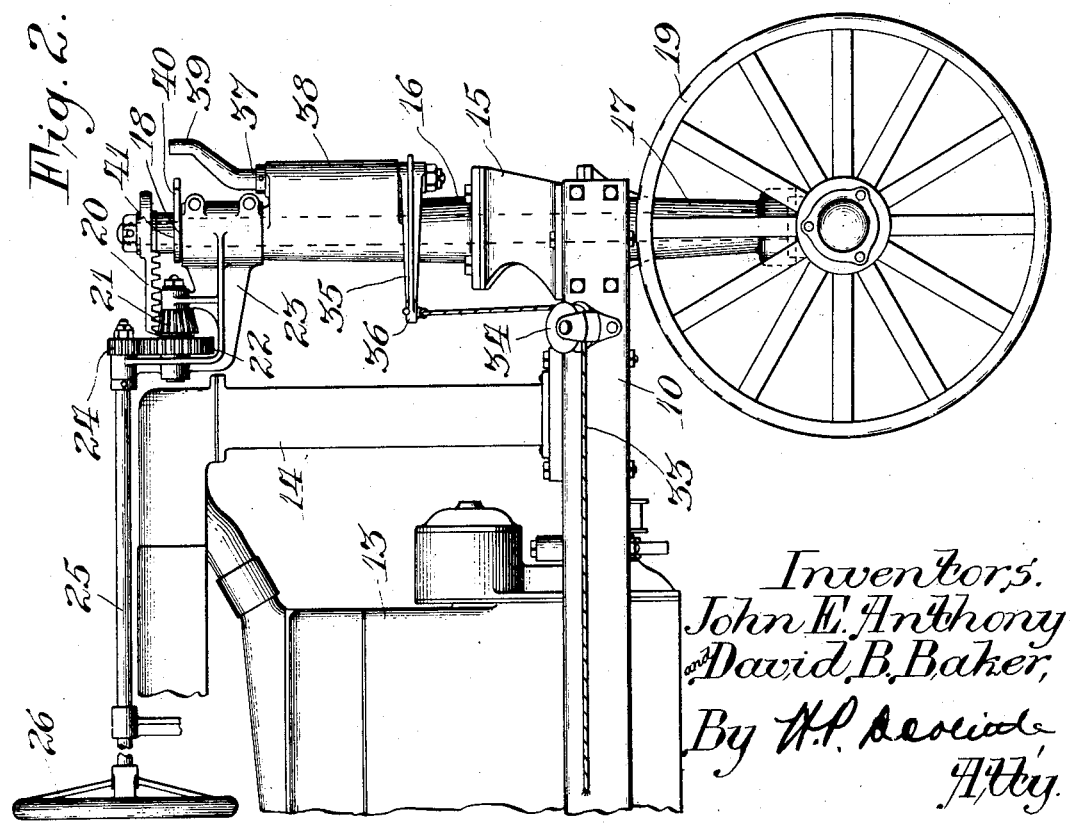
Inventors.
John E. Anthony
and David B. Baker,
By H. P. Doolittle
Atty.

Patented Jan. 11, 1927.

1,613,865

UNITED STATES PATENT OFFICE.

JOHN E. ANTHONY AND DAVID B. BAKER, OF CHICAGO, ILLINOIS, ASSIGNORS TO INTERNATIONAL HARVESTER COMPANY, OF CHICAGO, ILLINOIS, A CORPORATION OF NEW JERSEY.

STEERING MECHANISM FOR TRACTORS.

Application filed November 15, 1923. Serial No. 674,796.

This invention is directed to an improvement in the construction of farm and industrial tractors and more particularly in the steering mechanism thereof. The main object of the invention is to provide a tractor having quick turn mechanism of simple and efficient construction that will allow the tractor to be guided from side to side in the usual way and that will come into action to effect a short turn when the steering mechanism is moved a predetermined degree in either direction.

This has been accomplished by combining with a tractor, having differentially driven traction wheels and a centrally positioned front steering truck, a novel form of steering and quick turn mechanism consisting essentially of a brake for each traction wheel and control mechanism therefor that is adapted to be actuated by cooperating means on the truck after a predetermined angular movement thereof in either direction, thereby applying the brake to the differential drive of the traction wheel on the inside of the turn being made. The invention accordingly resides in the organization and details of construction, or equivalents thereof, hereinafter more particularly described and claimed.

In the accompanying drawings—

Fig. 1 is a plan view of a tractor embodying the invention;

Fig. 2 is a side elevation of the forward portion of a tractor showing the steering mechanism;

Fig. 3 is a vertical sectional view on an enlarged scale through the upper portion of the steering mechanism shown in Fig. 2;

Fig. 4 is a detail plan view on the line 4—4 of Fig. 3; and

Fig. 5 is a detail view of the brake shaft mountings.

In the present instance the invention is illustrated as embodied in a tractor comprising the longitudinal frame members 10 connected at their rear ends to a transverse axle housing 11 containing differentially driven shafts which drive each of the traction wheels 12. The frame members 10 support the engine 13 and radiator 14 and the forward ends of these members extend beyond the radiator and are connected by a cross head 15 which is preferably a casting that is provided at its center with a vertical opening in alinement with which there is secured to the member 15 upper and lower tubular sections 16, 17, forming a bearing post for the steering standard 18 of the truck 19. The standard 18 projects above the upper member 16 of the bearing post, and its projecting end has splined, or otherwise secured thereto, a horizontally positioned gear sector 20 which is in mesh with a pinion 21 secured to a gear 22, both of which are journaled on a short counter-shaft mounted in bearings in the bracket 23 which projects rearwardly from and is secured to the upper end of the tubular member 16. The gear 22 is in mesh with a spur pinion 24 on the end of the steering shaft 25 which extends rearwardly over the radiator and engine hood and has the hand wheel 26 secured to it at its rear end in convenient reach of the operator on the seat 27. It is evident that turning of shaft 25 to the right or left will transmit corresponding angular movement to the standard 18 and to the truck, thereby guiding or steering the tractor.

In order to provide for quick or short turning of the tractor, there is combined with the steering mechanism just described auxiliary short-turn mechanism comprising a brake 28 fixed on the projecting end of each of the differentially driven shafts, journaled in the housing 11 and which are geared within the housings 29, forming downward extensions of the housing 11, to the respective traction wheels 12. The brake band of each brake 28 is connected in the usual way to a rock shaft 30 journaled in bearings on the housing 11, and each of these shafts 30 at its inner end is provided with a depending crank arm 31 to which there is attached a coil spring 32 that is connected to a flexible element or cable 33 extending forwardly and passing over a pulley 34 on the forward end of each member 10 and thence upwardly and inwardly to a rocking member or lever 35 carried on the member 16 at the front of the tractor. The lever 35 is of substantially annular shape and in effect comprises a pair of connected arcuate arms which encircle the member 16 of the bearing post, their united rear ends being formed with an eye 36 in which the ends of the two cables 33 are secured, as shown in Fig. 4. At their front ends, the arms forming the member 35 are united and fixed to the lower end of a vertical rock shaft 37 journaled in bearings formed in a forward extension 38 of the tubular member 16. The upper end of shaft 37 is cranked, as at 39, and this cranked end is positioned between and in the path of movement of the angularly related pair of horizontally extending arms 40 which project from a collar or plate 41 fixed to the upper end of standard 18. The arms 40 constitute oppositely acting actuating means for the brakes 28, either arm being adapted to engage the crank 39 on shaft 37, after the truck 19 has been given a predetermined amount of angular movement in either direction. As will be evident, contact of either arm 40 with crank 39 will rock shaft 37 and, therefore, the lever 35 also and, as this lever swings, it will transmit a pull to one of the cables 33, thereby setting the brake to which that cable leads.

In operation the tractor may be guided from side to side without interference from the auxiliary quick turn mechanism until the steering truck is turned beyond a predetermined angle, which in this instance is approximately 45 degrees, in which event one of the arms 40 engages crank 39 and gradually brakes the wheel on the inner side of the turn, full application of the brake causing the tractor to turn on the inside traction wheel as a pivot.

It will be evident from the foregoing description that a simple and efficient construction has been devised for the purpose set forth and that certain modifications from the preferred form disclosed are possible without departure from the spirit of the invention as defined in the following claims.

What is claimed as new is:

1. In a tractor comprising a frame supported by differentially driven traction wheels and by a steering truck having a standard swiveled in a vertical bearing on the frame, the combination of short turn mechanism comprising a brake for each wheel, a cranked rock shaft parallel with the standard and journaled in an extension of the vertical bearing, a rocking ring member surrounding the standard and fixed to the rock shaft and having opposite connections to the brakes, and a brake actuating member fixed on said standard and having oppositely acting parts adapted to engage the cranked rock shaft after predetermined angular movement of the standard in either direction.

2. The combination with a tractor having differentially driven rear traction wheels and a fore-carriage having a standard swiveled in a vertical bearing on the frame, of short turn mechanism comprising a lever pivoted on the fore-carriage and movable with respect to the standard, a brake for each traction wheel, flexible connecting means extending from each brake to said lever, and means, including a member moving with said standard, for swinging the lever after predetermined turning movement of the standard in either direction.

3. The combination with a tractor having differentially driven rear traction wheels and a fore-carriage having a standard swiveled in a vertical bearing on the frame, of short turn mechanism comprising a lever pivoted on the fore-carriage to swing freely in a horizontal arc at the rear of said standard, a brake for each traction wheel, a flexible connecting element extending from each brake to the lever and passing over guides at each side of the tractor, and means, including a member movable with said standard through a horizontal arc, for swinging the lever after predetermined turning movement of the standard in either direction.

4. In a tractor comprising a frame supported by differentially driven traction wheels and by a steering truck having a standard swiveled in a vertical bearing on the frame, the combination of a short turn mechanism comprising a brake for each wheel, a vertical rock shaft journaled in the vertical bearing alongside the standard and having a cranked portion at its upper end, a horizontally disposed member having angularly spaced arms fixed to the standard adjacent the upper end of said cranked portion, and a brake actuating member connected with the brakes and fixed to the lower end of the vertical rock shaft.

5. The steering and quick turn construction for tractors which comprises a tractor frame having a central longitudinally extending portion and a transverse housing having ends extending beyond the longitudinal portion, traction wheels mounted on downward extensions at each end of said housing, a fore-carriage supporting the longitudinal portion of the frame and having a vertical standard journaled thereon, drive shafts for the traction wheels having ends extending beyond the ends of the transverse housing, brake mechanism secured on the shaft ends and housing, and operating mechanism therefor comprising a lever pivoted on the fore-carriage and movable with respect to the standard, a flexible connecting element extending from each brake mechanism to the lever and passing over guides at each side of the longitudinal frame portion, and means, including a member movable with said standard, for swinging the lever after predetermined turning movement of the standard in either direction.

6. In a tractor comprising a frame supported by differentially driven traction wheels and by a steering truck having a standard swiveled in a vertical bearing on the frame, the combination of a short turn mechanism comprising a brake for each wheel, a vertical rock shaft journaled in the vertical bearing alongside the standard and having a cranked portion at its upper end, a horizontally disposed member having angularly spaced arms fixed to the standard adjacent the upper end of said cranked portion, and a ring member having connections with the brakes surrounding the standard and fixed to the lower end of the rock shaft and adapted to be moved to actuate a brake when one of the arms on the horizontally disposed member engages the cranked portion of the rock shaft.

In testimony whereof we affix our signatures.

JOHN E. ANTHONY.
DAVID B. BAKER.